(12) United States Patent
Hiya

(10) Patent No.: US 11,050,361 B2
(45) Date of Patent: Jun. 29, 2021

(54) POWER CONVERTER

(71) Applicant: DENSO CORPORATION, Kariya (JP)

(72) Inventor: Yoshihiko Hiya, Toyota (JP)

(73) Assignee: DENSO CORPORATION, Kariya (JP)

( * ) Notice: Subject to any disclaimer, the term of this patent is extended or adjusted under 35 U.S.C. 154(b) by 11 days.

(21) Appl. No.: 16/737,424

(22) Filed: Jan. 8, 2020

(65) Prior Publication Data

US 2020/0252001 A1 Aug. 6, 2020

(30) Foreign Application Priority Data

Jan. 31, 2019 (JP) .............................. JP2019-016164

(51) Int. Cl.
*H02M 1/092* (2006.01)
*H02M 1/084* (2006.01)
*H02M 7/539* (2006.01)
*H02M 1/088* (2006.01)
*H02P 27/06* (2006.01)

(52) U.S. Cl.
CPC ........... *H02M 7/539* (2013.01); *H02M 1/088* (2013.01); *H02M 1/084* (2013.01); *H02M 1/092* (2013.01); *H02P 27/06* (2013.01)

(58) Field of Classification Search
CPC ............................. H02M 1/084; H02M 1/092
USPC ........................ 323/268, 271; 363/56.02, 97
See application file for complete search history.

(56) References Cited

U.S. PATENT DOCUMENTS

| | | | |
|---|---|---|---|
| 2010/0164735 A1* | 7/2010 | Hartman ................ | G01R 31/42 340/653 |
| 2010/0265740 A1* | 10/2010 | Zargari ................. | H02M 1/096 363/17 |
| 2013/0321037 A1* | 12/2013 | Eberlein ................... | G05F 1/10 327/109 |
| 2016/0020688 A1* | 1/2016 | Osanai ................... | H03K 17/56 327/109 |

FOREIGN PATENT DOCUMENTS

JP 2009-136115 A 6/2009
WO WO-2017159091 A1 * 9/2017 ........... B62D 5/0463

* cited by examiner

*Primary Examiner* — Gary A Nash
(74) *Attorney, Agent, or Firm* — Sughrue Mion, PLLC

(57) ABSTRACT

A controller and a plurality of driver circuits may be configured to operate selectively either in a normal mode or in a diagnostic mode. In the normal mode, the controller is configured to transmit a drive signal to each driver circuit via a corresponding drive signal line. Each driver circuit is configured to drive corresponding switching element(s) in response to the drive signal and is further configured to output a failure signal when the driver circuit detects a failure related to the corresponding switching element(s). In the diagnostic mode, the controller is configured to sequentially transmit a request signal to the driver circuits via their corresponding drive signal lines, and each driver circuit is configured to output the failure signal in response to the request signal in a case of having detected the failure during operation in the normal mode.

10 Claims, 6 Drawing Sheets

FIG. 6

| | States | Duty | Priority Order |
|---|---|---|---|
| 1 | Normal | 10% | — |
| 2 | Short-Circuited | 20% | 1 |
| 3 | Overcurrent | 30% | 2 |
| 4 | SW Heated | 40% | 3 |
| 5 | Abnormal Drive Voltage | 50% | 4 |
| 6 | Abnormal VCC Voltage | 60% | 5 |
| 7 | Abnormal IC Internal Power Supply | 70% | 6 |
| 8 | Abnormal MGND Voltage | 80% | 7 |
| 9 | IC Heated | 90% | 8 | ured to reduce a required number of signal lines and enable
POWER CONVERTER

CROSS-REFERENCE TO RELATED APPLICATION

This application claims priority to Japanese Patent Application No. 2019-016164, filed on Jan. 31, 2019, the entire contents of which are incorporated herein by reference.

TECHNICAL FIELD

The art disclosed herein relates to a power converter such as a converter (including a DC-DC converter) and an inverter.

BACKGROUND

Japanese Patent Application Publication No. 2009-136115 describes a power converter. This power converter includes a plurality of switching elements and a controller configured to control the switching elements via a driver unit. The driver unit monitors current and temperatures in the switching elements, and is configured to output a failure signal to the controller when a failure is detected in those indexes.

SUMMARY

In the aforementioned power converter, the driver unit is configured to individually output the failure signal for each of the switching elements. According to such a configuration, the controller can identify the switching element in which the failure was detected from among the switching elements. A large number of signal lines, however, must be provided between the driver unit and the controller for individually transmitting the failure signal outputted for each of the switching elements. To avoid this, a configuration in which failure signals are not distinguished among the switching elements, and a common failure signal is transmitted to the controller when a failure is detected in one of the switching elements could be employed. According to such a configuration, only one signal line for transmitting the common failure signal can simply be provided between the driver unit and the controller. With only the common failure signal, however, the controller cannot identify the switching element in which the failure was detected. In view of such a circumstance, the description herein provides art configured to reduce a required number of signal lines and enable a controller to transmit more information in a power converter.

A power converter disclosed herein may comprise: a plurality of switching elements; a plurality of driver circuits each of which is configured to drive corresponding one or more of the switching elements, each of the driver circuits being further configured to output a failure signal; an intermediate circuit connected to each of the driver circuits and configured to output a common failure signal when the intermediate circuit receives the failure signal from at least one of the driver circuits; and a controller connected to each of the driver circuits via corresponding one of drive signal lines and configured to receive the common failure signal outputted from the intermediate circuit. The controller and the driver circuits may be configured to operate selectively either in a normal mode or in a diagnostic mode. In the normal mode, the controller may be configured to transmit a drive signal to each of the driver circuits via the corresponding one of the drive signal lines. Further, each of the driver circuits may be configured to drive the corresponding one or more of the switching elements in response to the drive signal and is configured to output the failure signal when the driver circuit detects a failure related to the corresponding one or more of the switching elements. On the other hand, in the diagnostic mode, the controller may be configured to sequentially transmit a request signal to each of the driver circuits via the corresponding one of drive signal lines. Each of the driver circuits may be configured to output the failure signal in response to the request signal in a case of having detected the failure during operation in the normal mode.

In the aforementioned power converter, the controller and the driver circuits are configured to operate selectively either in the normal mode or in the diagnostic mode. In the normal mode, the common failure signal is transmitted to the controller when a failure is detected in one or more of the switching elements. Due to this, the controller can detect that the failure occurred in one or more of the switching elements. Since the controller does not have to receive failure signals from the respective driver circuits and instead, simply receives the common failure signal from the intermediate circuit, a large number of signal lines does not have to be provided between the controller and the intermediate circuit. On the other hand, the controller cannot identify a driver circuit in which the failure was detected by a mere reception of the common failure signal.

To deal with this, the controller and the driver circuits shift to the diagnostic mode to identify the driver circuit in which the failure was detected. In the diagnostic mode, the controller sequentially transmits the request signal to each of the driver circuits. This transmission of the request signal is executed using the drive signal lines, thus new signal lines therefor are not necessary. Each of the driver circuits having received the request signal outputs the failure signal in response to the request signal in the case where it had detected the failure while operating in the normal mode. The failure signal outputted from such a driver circuit is inputted to the controller as the common failure signal. As above, in the diagnostic mode, when the request signal which the controller outputted is inputted to the driver circuit that had detected the failure, the common failure signal is inputted to the controller in response thereto. Due to this, the controller can identify in which one of the driver circuits the failure was detected without individually receiving failure signals from the respective driver circuits.

BRIEF DESCRIPTION OF DRAWINGS

FIG. 6 shows a table of plural types of failures which driver circuits DR1 to DR6 detect and a duty ratio and priority allocated thereto.

DETAILED DESCRIPTION

Figure 1:
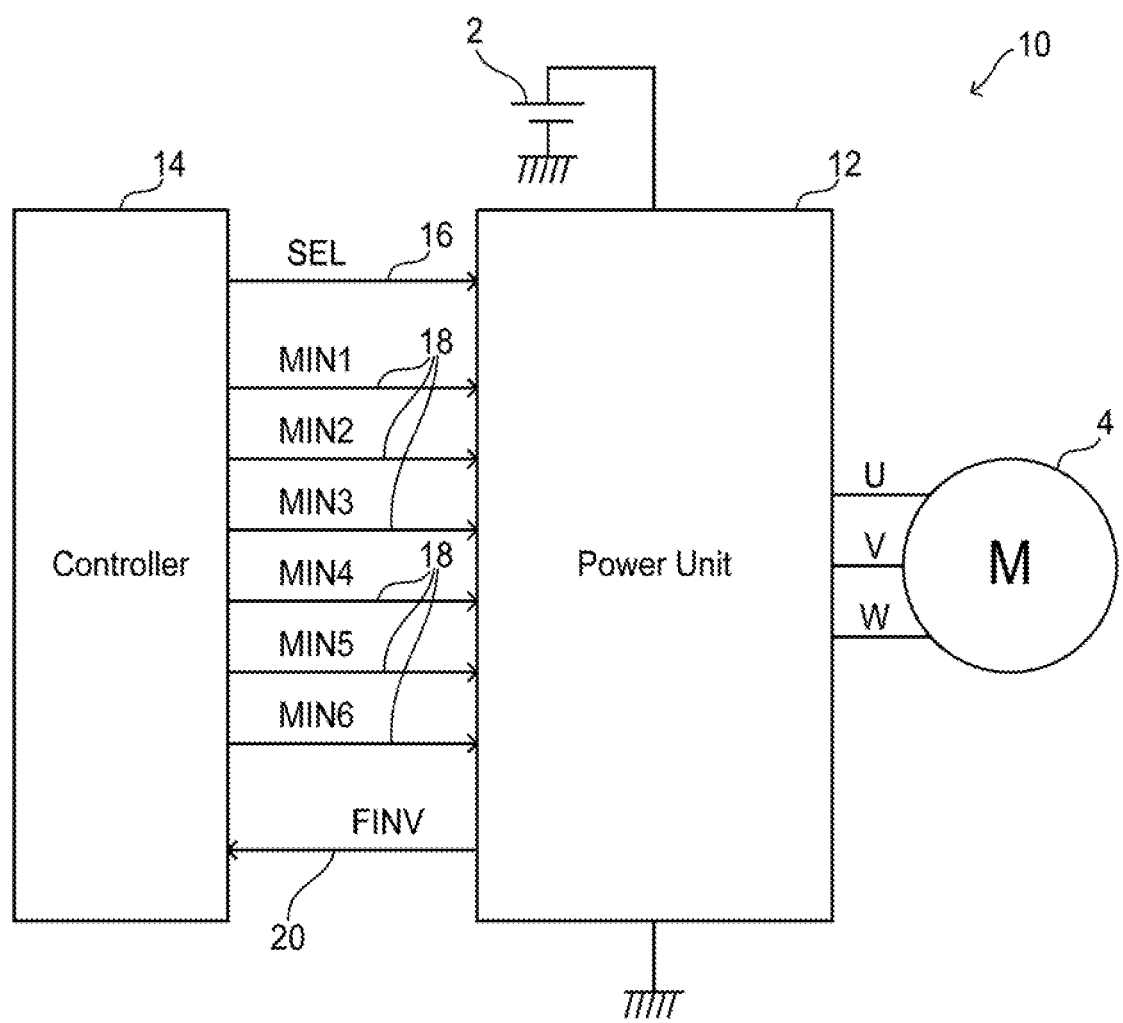
FIG. 1 is a block diagram showing a configuration of a power converter 10.

In an aspect of the art disclosed herein, a controller may be configured to transmit a mode switching signal to each of a plurality of driver circuits. In this case, each of the driver circuits may be configured to operate selectively either in a normal mode or in a diagnostic mode according to its received mode switching signal. According to this configuration, operation modes of the respective driver circuits can be centrally controlled by the controller.

As another aspect, however, the mode switching signal may be transmitted to the respective driver circuits from another device instead of or in addition to the controller. In this case, the mode switching signal may be transmitted to the respective driver circuits via power supply lines configured to supply power to the respective driver circuits. That is, transmission of the mode switching signal may be executed via power line communication. According to this configuration, new signal lines for transmitting the mode switching signal do not need to be provided.

In the aforementioned aspect, the controller may be configured to shift from the normal mode to the diagnostic mode when the controller receives a common failure signal during operation in the normal mode, and to further cause each of the driver circuits to shift from the normal mode to the diagnostic mode by using the mode switching signal. According to this configuration, when a failure is detected in a driver circuit, this driver circuit (a switching element in which the failure occurred) can be promptly identified.

In an aspect of the art disclosed herein, the controller may be connected to each of the driver circuits via one or more mode switching signal lines. In this case, the mode switching signal may be transmitted from the controller to each of the driver circuits via the one or more mode switching signal lines. As above, the mode switching signal may be transmitted to the respective driver circuits via such dedicated signal lines.

Instead of the above, the mode switching signal may be transmitted from the controller to each of the driver circuits via corresponding one of drive signal lines. As above, by utilizing existing drive signal lines, the mode switching signal can be transmitted to each of the driver circuits without requiring new signal lines.

In an aspect of the art disclosed herein, the mode switching signal may be a pulse train. In this case, each of the driver circuits may operate selectively either in the normal mode or in the diagnostic mode according to a duty ratio of the mode switching signal. As another aspect, however, the mode switching signal may be a simple pulse signal. Specific configurations of the mode switching signal are not particularly limited.

In an aspect of the art disclosed herein, a failure signal may include an element identification signal at least in the diagnostic mode. In this case, the element identification signal may be different for each of the driver circuits. The element identification signal included in the failure signal may be inputted to the controller as a part of the common failure signal. Based on the received element identification signal, the controller can more accurately identify the driver circuit that had outputted the failure signal, that is, the driver circuit that detected the failure.

In an aspect of the art disclosed herein, each of the driver circuits may be configured to distinguish between and detect plural types of failures. In this case, the failure signal may include a failure identification signal at least in the diagnostic mode. Further, the failure identification signal may be different for each type of detected failure. The failure identification signal included in the failure signal is inputted to the controller as a part of the common failure signal. Based on the received failure identification signal, the controller can accurately identify the type of the detected failure.

In the aforementioned aspect, the failure identification signal may be a pulse train. In this case, a duty ratio of the pulse train may be changed in accordance with a type of the detected failure. According to this configuration, the controller can accurately identify the type of the detected failure based on the received failure identification signal.

In the aforementioned aspect, each of the driver circuits may store a priority order regarding the plural types of failures. Further, each of the driver circuits may be further configured, when the driver circuit detects two or more types of failures, to output a failure identification signal corresponding to a failure with a highest priority among the two or more types of detected failures. According to this configuration, even when two or more types of failures are detected, the controller can be ensured to detect a failure that is more serious than others, and to suitably execute a process corresponding to this failure.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved power converters, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

A power converter 10 of an embodiment will be described with reference to the drawings. The power converter 10 of the present embodiment is mounted in a vehicle such as a hybrid vehicle, a fuel cell vehicle, or an electric vehicle, and is configured to execute power conversion between a DC power source 2 and a load 4. The load 4 is a motor generator, and is configured to drive wheels of the vehicle. The art disclosed in this embodiment is not, however, limited to the power converter 10 mounted on the vehicle, but may widely be employed in power converters of various purposes.

As shown in FIG. 1, the power converter 10 of the embodiment comprises a power unit 12 and a controller 14.

The power unit 12 is electrically connected between the DC power source 2 and the load 4. Although details will be described later, the power unit 12 has a circuit structure of a three-phase inverter, and DC power from the DC power source 2 is converted to three-phase AC power in the power unit 12 and is supplied to the load 4 (motor generator). Further, three-phase AC power from the load 4 is converted to DC power in the power unit 12 and is supplied to the DC power source 2.

The controller 14 is connected to the power unit 12 via a plurality of signal lines 16, 18, 20, and is configured to control operation of the power unit 12. The signal lines 16, 18, 20 include the mode switching signal line 16, the plurality of drive signal lines 18, and the common failure signal line 20. The mode switching signal line 16 is configured to transmit a mode switching signal SEL which the controller 14 outputs to the power unit 12. The plurality of drive signal lines 16 is configured to transmit drive signals MIN1 to MIN6 which the controller 14 outputs to the power unit 12. Further, the common failure signal line 20 is configured to transmit a common failure signal FINV which the power unit 12 outputs to the controller 14. These signals SEL, MIN1 to MIN6, FINV will be described later in detail.

Figure 2:
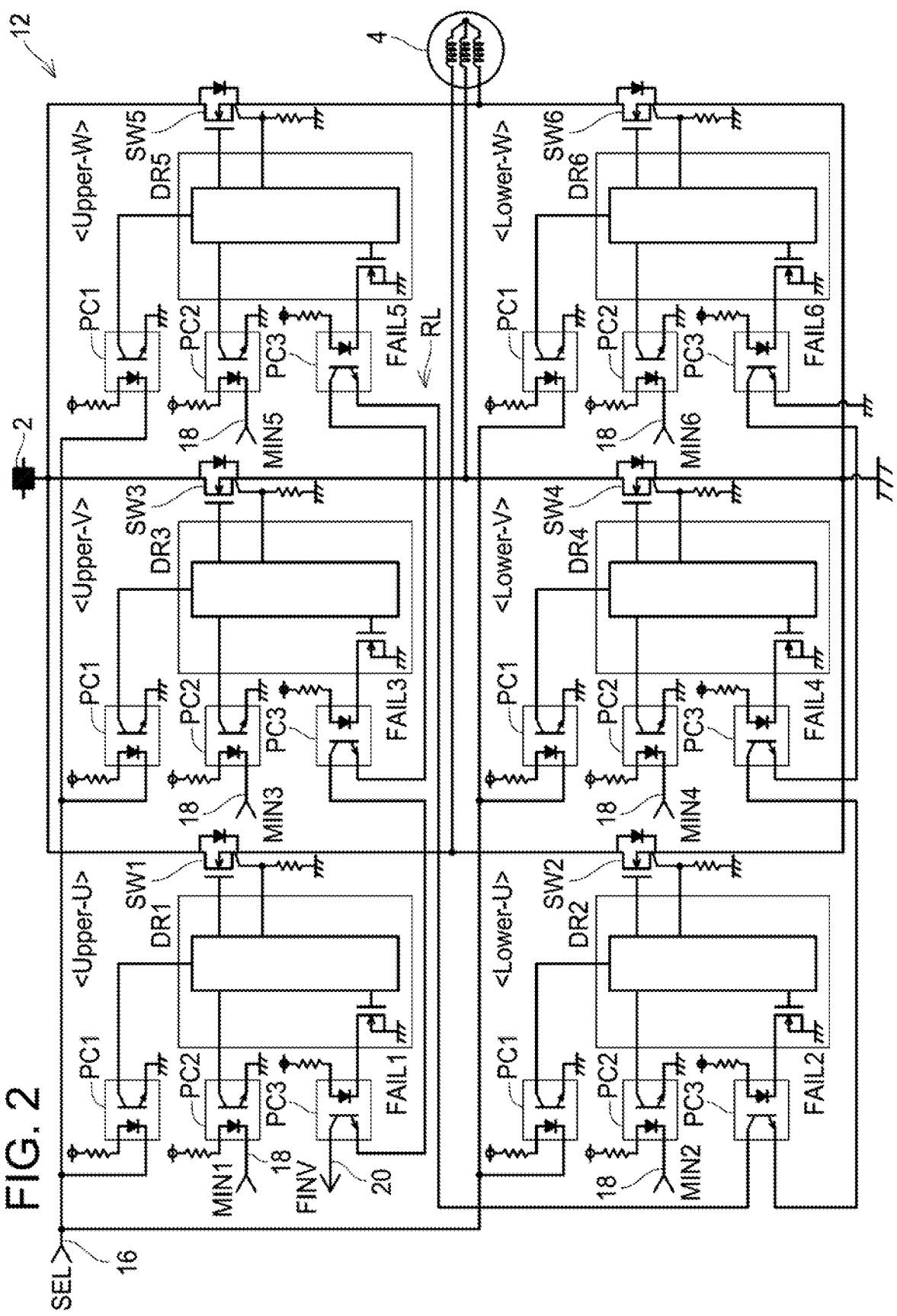
FIG. 2 is a circuitry block diagram showing a configuration of a power unit 12.

As shown in FIG. 2, the power unit 12 comprises a plurality of switching elements SW1 to SW6. Each of the switching elements SW1 to SW6 is not particularly limited, however, it may be an Insulated Gate Bipolar Transistor (IGBT) or a Metal-Oxide-Semiconductor Field-Effect Transistor (MOSFET). The switching elements SW1 to SW6 include the first switching element SW1, the second switching element SW2, the third switching element SW3, the fourth switching element SW4, the fifth switching element SW5, and the sixth switching element SW6. The first switching element SW1 is provided on a U-phase upper arm connecting a positive electrode of the DC power source 2 and a U-phase terminal of the load 4, and the second switching element SW2 is provided on a U-phase lower arm connecting a negative electrode of the DC power source 2 and a U-phase terminal of the load 4. The third switching element SW3 is provided on a V-phase upper arm connecting the positive electrode of the DC power source 2 and a V-phase terminal of the load 4, and the fourth switching element SW4 is provided on a V-phase lower arm connecting the negative electrode of the DC power source 2 and the V-phase terminal of the load 4. The fifth switching element SW5 is provided on a W-phase upper arm connecting the positive electrode of the DC power source 2 and a W-phase terminal of the load 4, and the sixth switching element SW6 is provided on a W-phase lower arm connecting the negative electrode of the DC power source 2 and the W-phase terminal of the load 4. Due to this, the switching elements SW1 to SW6 configure a three-phase inverter circuit. As another embodiment, each of the arms may comprise two or more switching elements.

The power unit 12 further comprises a plurality of driver circuits DR1 to DR6. The driver circuits DR1 to DR6 include the first driver circuit DR1, the second driver circuit DR2, the third driver circuit DR3, the fourth driver circuit DR4, the fifth driver circuit DR5, and the sixth driver circuit DR6. The first driver circuit DR1 is connected to the first switching element SW1, and is configured to control operation of the first switching element SW1 according to the drive signal MIN1 which the controller 14 outputs. Similarly, the other driver circuits DR2 to DR6 are respectively connected to the other switching elements SW2 to SW6 corresponding thereto, and are respectively configured to control operations of the switching elements SW2 to SW6 according to the drive signals MIN2 to MIN6 which the controller 14 outputs. In the case where two or more switching elements are provided on each of the arms, each of the driver circuits DR1 to DR6 may be configured to drive its corresponding two or more switching elements. Further, some or all of the driver circuits DR1 to DR6 may be constituted of individual units or modules having equivalent functions.

Each of the driver circuits DR1 to DR6 is connected to the controller 14 via corresponding one of drive signal lines 18, and the drive signals MIN1 to MIN6 which the controller 14 outputted are inputted to the respective driver circuits DR1 to DR6 via the corresponding drive signal lines 18. Each of the drive signal lines 18 is provided with a photocoupler PC2 for electrically insulating the controller 14 from its corresponding one of the driver circuits DR1 to DR6. Further, each of the driver circuits DR1 to DR6 is connected to the controller 14 via the mode switching signal line 16, and the mode switching signal SEL which the controller 14 outputted is inputted to the respective driver circuits DR1 to DR6 via the mode switching signal line 16. A photocoupler PC1 is provided between the mode switching signal line 16 and each of the driver circuits DR1 to DR6 for electrically insulating the controller 14 from the respective driver circuits DR1 to DR6.

The driver circuits DR1 to DR6 respectively monitor state indexes of the switching elements SW1 to SW6, and are configured to output failure signals FAIL1 to FAIL6 when a failure is detected regarding their state indexes. For example, the first driver circuit DR1 monitors the state indexes of the first switching element SW1, and is configured to output the failure signal FAIL1 when a failure is detected regarding the state indexes. Similarly, the other driver circuits DR2 to DR6 respectively monitor the state indexes of the other switching elements SW2 to SW6, and are configured to output the failure signals FAIL2 to FAIL6 when a failure is detected regarding the state indexes. The state indexes described herein may for example be current, voltage, and temperature of the switching elements SW1 to SW6. Each of the driver circuits DR1 to DR6 may simply need to monitor at least one of such state indexes. In addition, each of the driver circuits DR1 to DR6 has a self-diagnosis function, and is configured to output corresponding one of the failure signals FAIL1 to FAIL6 when a failure is detected related to the driver circuit's own function.

The power unit 12 further comprises an intermediate circuit RL. The intermediate circuit RL is connected to each of the driver circuits DR1 to DR6, and is configured to receive the failure signals FAIL1 to FAIL6 respectively outputted from the driver circuits DR1 to DR6. Further, the intermediate circuit RL is configured to output a common failure signal FINV when it receives at least one of the failure signals FAIL1 to FAIL6 from the driver circuits DR1 to DR6. The common failure signal FINV which the intermediate circuit RL outputted is transmitted to the controller 14. The intermediate circuit RL is connected to the controller 14 via the common failure signal line 20, and the common failure signal FINV which the intermediate circuit RL outputted is inputted to the controller 14 via the common failure signal line 20.

A specific configuration of the intermediate circuit RL is not particularly limited. The intermediate circuit RL may simply be configured to output the common failure signal FINV when it receives corresponding one of the failure signals FAIL1 to FAIL6 from at least one of the driver circuits DR1 to DR6. Although this is merely an example, the intermediate circuit RL in the present embodiment includes a plurality of photocouplers PC3 connected in series, and the failure signals FAIL1 to FAIL6 which the driver circuits DR1 to DR6 output are configured to be inputted respectively to the photocouplers PC3. By configuring as such, the common failure signal line 20 is connected to a ground potential via the photocouplers PC3 when none of the driver circuits DR1 to DR6 are outputting the failure signals FAIL1 to FAIL6. That is, in this case, the controller 14 determines that the common failure signal FINV is not outputted. On the other hand, when at least one of the driver circuits DR1 to DR6 outputs the corresponding one of the failure signals FAIL1 to FAIL6, the common failure signal line 20 is electrically cut off from the ground potential by at least one photocoupler PC3. In this case, the controller 14 determines that the common failure signal FINV is outputted. As above, the intermediate circuit RL is configured to output a logical sum signal of all the failure signals FAIL1 to FAIL6 as the common failure signal FINV.

In the power converter 10 of the present embodiment, the controller 14 and the driver circuits DR1 to DR6 are each configured to operate selectively either in a normal mode or in a diagnostic mode. In the normal mode, the controller 14 transmits the drive signals MIN1 to MIN6 to the respective driver circuits DR1 to DR6 via their corresponding drive signal lines 18. Then, each of the driver circuits DR1 to DR6 drives its corresponding one of the switching elements SW1 to SW6 according to the corresponding one of the drive signals MIN1 to MIN6 which it received. Due to this, desired power conversion is executed between the DC power source 2 and the load 4.

In parallel to the aforementioned operation, each of the driver circuits DR1 to DR6 monitors the state indexes of the corresponding one of the switching elements SW1 to SW6 and of itself, and outputs the corresponding one of the failure signals FAIL1 to FAIL6 when a failure is detected regarding the state indexes. When at least one of the driver circuits DR1 to DR6 outputs its corresponding one of the failure signals FAIL1 to FAIL6, the common failure signal FINV is transmitted from the intermediate circuit RL to the controller 14. For example, in an example shown in FIG. 3, the fourth driver circuit DR4 detects a failure in the fourth switching element SW4 or in itself, and outputs the failure signal FAIL4. Then, the common failure signal FINV is transmitted to the controller 14 due to the fourth driver circuit DR4 having outputted the failure signal FAIL4.

Figure 3:
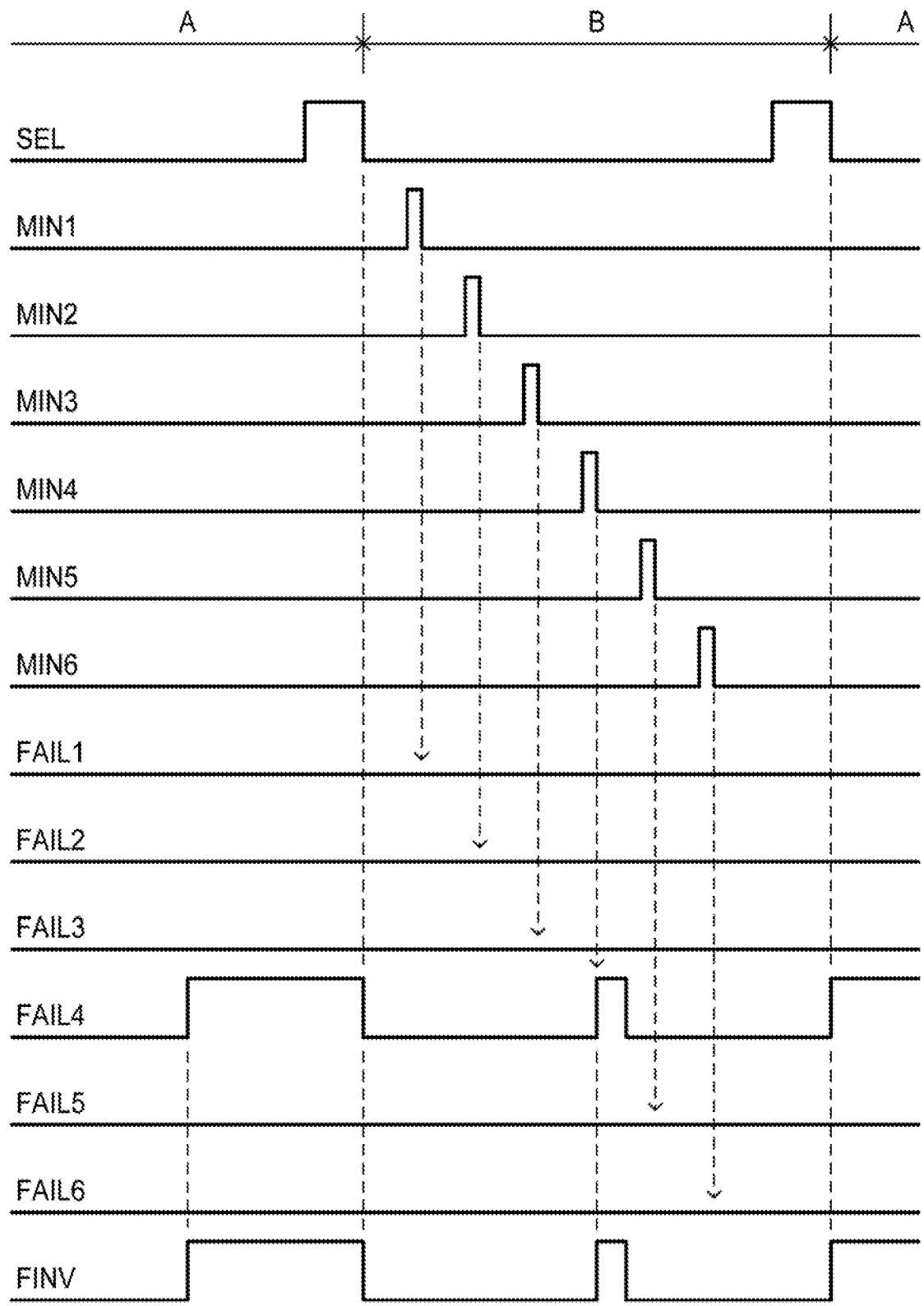
FIG. 3 is a time chart showing respective signals SEL, MIN1 to MIN6, FAIL1 to FAIL6, and FINV.

As shown in FIG. 3, when the controller 14 operating in the normal mode (A in FIG. 3) receives the common failure signal FINV, it shifts from the normal mode (A in FIG. 3) to the diagnostic mode (B in FIG. 3). At this occasion, the controller 14 transmits the mode switching signal SEL to each of the driver circuits DR1 to DR6. When the mode switching signal SEL is received, each of the driver circuits DR1 to DR6 shifts from the normal mode (A) to the diagnostic mode (B). In the diagnostic mode, the controller 14 sequentially transmits request signals MIN1 to MIN6 to the respective driver circuits DR1 to DR6 via the corresponding drive signal lines 18. By doing so, the driver circuits DR1 to DR6 respectively receive the request signals MIN1 to MIN6 at timings that differ from each other. Since the request signals MIN1 to MIN6 are signals that are transmitted via the drive signal lines 18 similarly to the drive signals MIN1 to MIN6, same reference signs MIN1 to MIN6 are given to both of these signals.

The driver circuits DR1 to DR6 output the failure signals FAIL1 to FAIL6 in response to the request signals MIN1 to MIN6 in a case of having detected a failure in the normal mode (A) that had previously taken place. Due to this, each of the driver circuits DR1 to DR6 may store a predetermined flag upon shifting from the normal mode (A) to the diagnostic mode (B) in the case of having detected the failure during its operation in the normal mode (A). In the example shown in FIG. 3, the fourth driver circuit DR4 outputs the failure signal FAIL4 in response to the request signal MIN4 from the controller 14. When the fourth switching element SW4 outputs the failure signal FAIL4, the common failure signal FINV is transmitted from the intermediate circuit RL to the controller 14 via the common failure signal line 20. The controller 14 can detect that the failure had been detected in the fourth driver circuit DR4 based on a timing of having transmitted the request signal MIN4 and a timing of having received the common failure signal FINV. After execution of the diagnostic mode (B), the controller 14 transmits the mode switching signal SEL to each of the driver circuits DR1 to DR6. Then, the controller 14 also shifts from the diagnostic mode (B) to the normal mode (A). When the mode switching signal SEL is received, each of the driver circuits DR1 to DR6 shifts from the diagnostic mode (B) to the normal mode (A).

As above, in the power converter 10 of the present embodiment, the controller 14 and the driver circuits DR1 to DR6 are configured to operate selectively either in the normal mode (A) or in the diagnostic mode (B). In the normal mode (A), the common failure signal FINV is transmitted to the controller 14 when a failure is detected in one or more of the switching elements SW1 to SW6 (or one or more of the driver circuits DR1 to DR6). Due to this, the controller 14 can detect that the failure had occurred in one or more of the switching elements SW1 to SW6 (or one or more of the driver circuits DR1 to DR6). The controller 14 does not receive the failure signals FAIL1 to FAIL6 individually, and instead may receive only the common failure signal FINV from the intermediate circuit RL, thus there is no need to provide a large number of signal lines between the controller 14 and the intermediate circuit RL. On the other hand, however, by a mere reception of the common failure signal FINV, the controller 14 cannot identify which one of the driver circuits DR1 to DR6 had detected the failure.

To address this, the controller 14 and the driver circuits DR1 to DR6 shift to the diagnostic mode (B) to identify which one of the driver circuits DR1 to DR6 had detected the failure. In the diagnostic mode (B), the controller 14 sequentially transmits the request signals MIN1 to MIN6 to the respective driver circuits DR1 to DR6. Since this transmission of the request signals MIN1 to MIN6 is executed via the drive signal lines 18, new signal lines dedicated thereto are not necessary. The driver circuits DR1 to DR6, which have received the request signals MIN1 to MIN6, output the failure signals FAIL1 to FAIL6 in response to the request signals MIN1 to MIN6 if the failure had been detected in the normal mode (A). The failure signals FAIL' to FAIL6 outputted by the driver circuits DR1 to DR6 are inputted to the controller 14 as the common failure signal FINV. As above, in the diagnostic mode, when corresponding one of the request signals MIN1 to MIN6 which the controller 14 outputted is inputted to one of the driver circuits DR1 to DR6 which had detected the failure, the common failure signal FINV is inputted to the controller 14 in response thereto. Due to this, the controller 14 can identify in which one of the driver circuits DR1 to DR6 the failure had been detected without individually receiving the failure signals FAIL1 to FAIL6 from the respective driver circuits DR1 to DR6.

In the power converter 10 of the present embodiment, the mode switching signal SEL which the controller 14 outputs is transmitted to the respective driver circuits DR1 to DR6 via the mode switching signal line 16. In regard to this feature, in another embodiment, the mode switching signal SEL may be transmitted from the controller 14 to the respective driver circuits DR1 to DR6 via their corresponding drive signal lines 18. By using the existing drive signal lines 18 as above, the mode switching signal SEL can be transmitted to the respective driver circuits DR1 to DR6 without newly providing the mode switching signal line 16.

Figure 4:
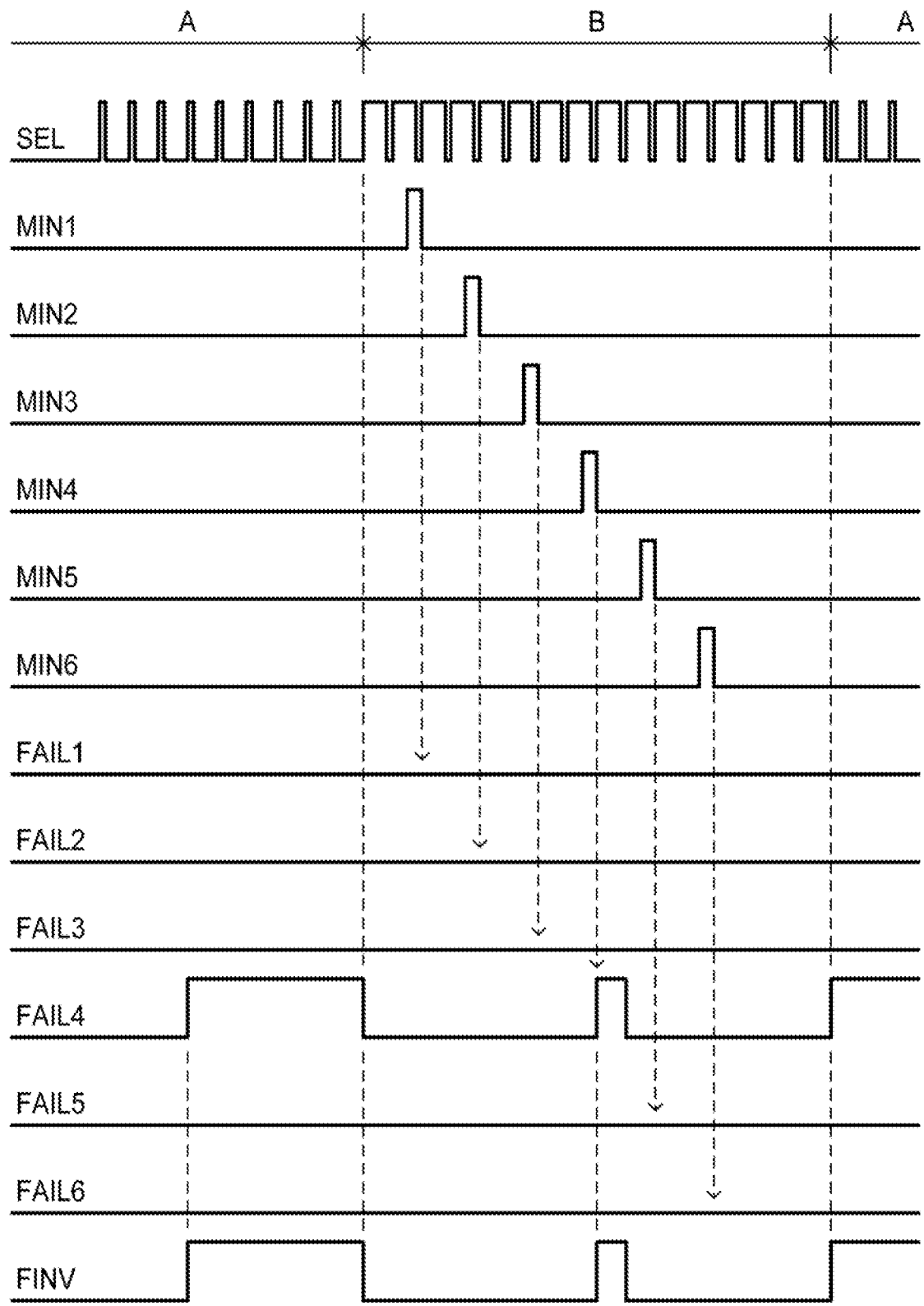
FIG. 4 is a time chart related to a variant and shows a mode switching signal SEL of a pulse train.

In the power converter 10 of the present embodiment, the mode switching signal SEL is a pulse signal outputted in a one-time manner, as shown in FIG. 3. In regard to this feature, in another embodiment, the mode switching signal SEL may be a pulse train as shown in FIG. 4. In this case, the controller 14 can change a duty ratio of the mode switching signal SEL according to the mode of operation (being the normal mode or the diagnostic mode). Further, each of the driver circuits DR1 to DR6 may operate selectively either in the normal mode or in the diagnostic mode according to the duty ratio of the mode switching signal SEL. According to this configuration, the driver circuits DR1 to DR6 can be suppressed from inadvertently shifting to the diagnostic mode (or to the normal mode) by an influence of noise, for example.

Figure 5:
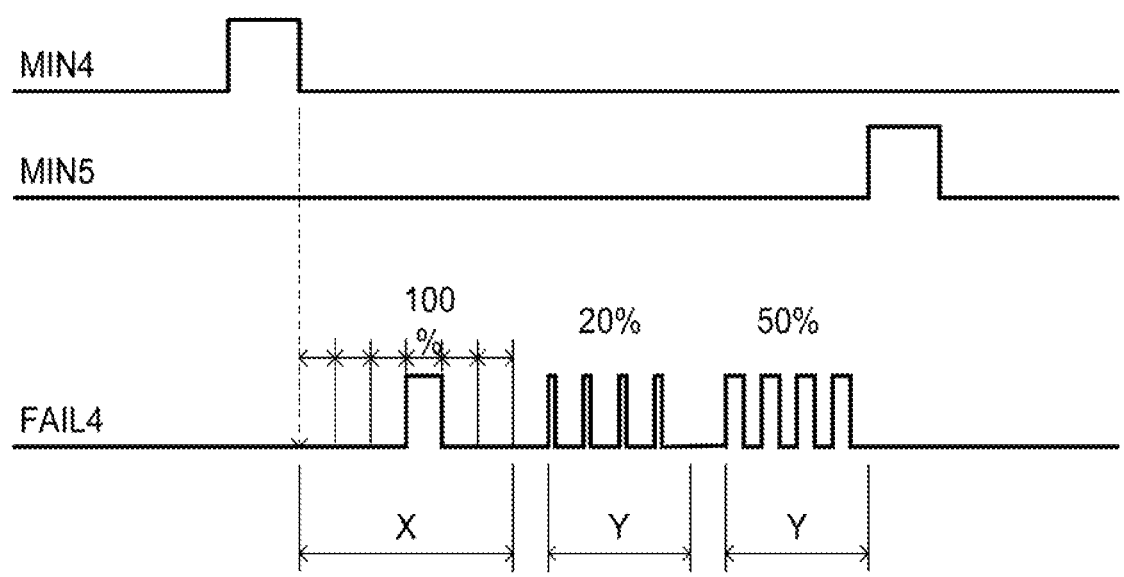
FIG. 5 is a time chart related to a variant and shows a failure signal FAIL4 including an element identification signal X and a failure identification signal Y.

In the power converter 10 of the present embodiment, as shown in FIG. 5, each of the failure signals FAIL1 to FAIL6 may include an element identification signal X. In this case, the element identification signal X may be different for each of the driver circuits DR1 to DR6. FIG. 5 shows an example in which the request signals MIN4, MIN5 for the fourth driver circuit DR4 and the fifth driver circuit DR5 as well as the failure signal FAIL4 outputted by the fourth driver circuit DR4 are enlarged. The element identification signal X included in the respective failure signals FAIL1 to FAIL6 is inputted to the controller 14 as a part of the common failure signal FINV. Based on the received element identification signal X, the controller 14 can accurately identify which one of the driver circuits DR1 to DR6 had outputted the failure signals FAIL1 to FAIL6, that is, which one of the driver circuits DR1 to DR6 had detected the failure. The element identification signal X shown in FIG. 5 is an example of a signal string "000100" assigned to the fourth driver circuit DR4.

In addition to or as an alternative to the above, the failure signals FAIL1 to FAIL6 may each include a failure identification signal Y as shown in FIG. 5. In this case, the failure identification signal Y may be a signal that differs according to a type of the detected failure. As shown in FIG. 6, each of the driver circuits DR1 to DR6 is configured to detect plural types of failures (items 2 to 9 in FIG. 6) by distinguishing them for its corresponding one of the switching elements SW1 to SW6 and itself (being one of the driver circuits DR1 to DR6). By configuring the failure identification signal Y to be different according to the type of the detected failure, the controller 14 that had received the common failure signal FINV can identify the type of the detected failure based on the failure identification signal Y included in the common failure signal FINV. According to this, the controller 14 can execute suitable process according to the type of the detected failure.

Although this is merely an example, the failure identification signal Y may be a pulse train, and a duty ratio thereof may be changed according to the type of the detected failure. As shown in FIG. 6, in a case where a short circuit (item 2) is detected in one of the switching elements SW1 to SW6, for example, the duty ratio of the failure identification signal Y is set to 20 percent. According to this configuration, the controller 14 can accurately identify the type of the detected failure based on the received failure identification signal Y. The failure identification signal Y is not limited to the pulse train. The failure identification signal Y may have any configuration so long as the types of failures can be identified by the controller 14, and a specific configuration thereof is not particularly limited.

As shown in FIG. 6, each of the driver circuits DR1 to DR6 may store a priority order regarding the plural types of failures. Further, in a case of having detected two or more types of failures, each of the driver circuits DR1 to DR6 may output the failure identification signal Y corresponding to the failure with a highest priority. According to this configuration, even when two or more types of failures are detected, the controller 14 can be ensured to detect the failure that is more serious than others, and a process corresponding to this failure can suitably be executed. Here, as shown in FIG. 5, each of the failure signals FAIL1 to FAIL6 may include two or more failure identification signals Y. In this case, in a case of having detected three or more types of failures, each of the driver circuits DR1 to DR6 may output the failure identification signals Y respectively corresponding to the two failures with higher priorities.

The power converter 10 described herein includes six switching elements SW1 to SW6 which constitute a three-phase inverter circuit. In regard to this feature, the power converter 10 may include at least two switching elements which constitute a DC-DC converter. In the art disclosed herein, a specific number of the switching elements and a circuit structure constituted thereby (that is, a connection structure of the switching elements) may be modified or changed in various patterns.

What is claimed is:

1. A power converter comprising:
   a plurality of switching elements;
   a plurality of driver circuits each of which is configured to drive corresponding one or more of the switching elements, each of the driver circuits being further configured to output a failure signal;
   an intermediate circuit connected to each of the driver circuits and configured to output a common failure signal when the intermediate circuit receives the failure signal from at least one of the driver circuits; and
   a controller connected to each of the driver circuits via corresponding one of drive signal lines and configured to receive the common failure signal outputted from the intermediate circuit,
   wherein
   the controller and the plurality of driver circuits are configured to operate selectively either in a normal mode or in a diagnostic mode,
   in the normal mode:
   the controller is configured to transmit a drive signal to each of the driver circuits via the corresponding one of the drive signal lines; and
   each of the driver circuits is configured to drive the corresponding one or more of the switching elements in response to the drive signal and is configured to output the failure signal when the driver circuit detects a failure related to the corresponding one or more of the switching elements, and
   in the diagnostic mode:
   the controller is configured to sequentially transmit a request signal to each of the driver circuits via the corresponding one of drive signal lines; and each of the driver circuits is configured to output the failure signal in response to the request signal in a case of having detected the failure during operation in the normal mode.

2. The power converter according to claim 1, wherein
the controller is configured to transmit a mode switching signal to each of the driver circuits, and
each of the driver circuits is configured to operate selectively either in the normal mode or in the diagnostic mode in accordance with the received mode switching signal.

3. The power converter according to claim 2, wherein, when the controller receives the common failure signal during operation in the normal mode, the controller is configured to shift from the normal mode to the diagnostic mode and to further transmit the mode switching signal to each of the driver circuits.

4. The power converter according to claim 2, wherein
the controller is connected to each of the driver circuits via one or more mode switching signal lines, and
the mode switching signal is transmitted from the controller to each of the driver circuits via the one or more mode switching signal lines.

5. The power converter according to claim 2, wherein the mode switching signal is transmitted to each of the driver circuits via the corresponding one of the drive signal lines.

6. The power converter according to claim 2, wherein the mode switching signal is a pulse train, and each of the driver circuits is configured to operate selectively either in the normal mode or in the diagnostic mode in accordance with a duty ratio of the mode switching signal.

7. The power converter according to claim 1, wherein
the failure signal includes an element identification signal at least in the diagnostic mode, and the element identification signal is different for each of the driver circuits.

8. The power converter according to claim 1, wherein
the failure comprises plural types of failures,
each of the driver circuits is configured to distinguish between and detect the plural types of failures, and
the failure signal includes a failure identification signal at least in the diagnostic mode, and the failure identification signal is different for each type of detected failure.

9. The power converter according to claim 8, wherein the failure identification signal is a pulse train and a duty ratio of the pulse train is changed in accordance with a type of the detected failure.

10. The power converter according to claim 1, wherein each of the driver circuit stores a priority order regarding the plural types of failures and is further configured, when the driver circuit detects two or more types of failures, to output a failure identification signal corresponding to a failure with a highest priority among the two or more types of detected failures.

* * * * *